United States Patent [19]

Domigan

[11] Patent Number: 5,675,194
[45] Date of Patent: Oct. 7, 1997

[54] MODULAR POWER DISTRIBUTION SYSTEM

[75] Inventor: Charles N. Domigan, Coolville, Ohio

[73] Assignee: Walker Systems, Inc., Williamstown, W. Va.

[21] Appl. No.: 657,891

[22] Filed: Jun. 7, 1996

[51] Int. Cl.⁶ ...................................................... H02J 3/00
[52] U.S. Cl. ........................... 307/147; 361/627; 361/634; 361/644; 439/215; 174/50
[58] Field of Search ............................ 307/147; 361/627, 361/634, 644, 648, 652; 439/215, 94; 174/50

[56] References Cited

U.S. PATENT DOCUMENTS

| | | | |
|---|---|---|---|
| 3,715,627 | 2/1973 | D'Ausilio | 317/99 |
| 4,165,443 | 8/1979 | Figart et al. | 174/53 |
| 4,538,073 | 8/1985 | Freige et al. | 307/33 |
| 5,171,159 | 12/1992 | Byrne | 439/215 |
| 5,203,711 | 4/1993 | Bogiel | 439/215 |
| 5,336,097 | 8/1994 | Williamson et al. | 439/94 |
| 5,562,469 | 10/1996 | Nienhuis et al. | 439/275 |

Primary Examiner—William M. Shoop, Jr.
Assistant Examiner—Albert W. Paladini
Attorney, Agent, or Firm—McAndrews, Held & Malloy, Ltd.

[57] ABSTRACT

A modular power distribution system is ideally suited for use in modular buildings of the type in which prefabricated building modules are constructed at a manufacturing factory and shipped to a remote building site where the modules are interconnected to form the complete structure. The modular power distribution system includes a primary power distribution panel positioned in one of the building modules and is adapted to distribute power from the utility service to the building modules. Modular power distribution units positioned in each of the building modules are adapted to distribute power within a respective building module. The primary power distribution panel has a plurality of main circuit breakers, each of which is electrically connected between the utility service and one of the modular power distribution units for limiting the maximum current through a respective modular power distribution unit. Each modular power distribution unit also includes a secondary power distribution panel which is physically and electrically interconnected with an associated service distribution unit. The secondary power distribution panel includes a plurality of secondary circuit breakers, and the service distribution unit includes a plurality of modular electrical connector first portions. Each of the modular connector first portions is connected to receive power through a different one of the secondary circuit breakers. Each building unit also includes a plurality prewired electrical fixture units. Each of the prewired electrical fixture units includes an electrical fixture, a modular electrical connector second portion, and a plurality of electrical conductors extending between the electrical fixture and the electrical connector to transmit electrical power therebetween. The connector second portions are electrically and physically mateable with the connector first portions to electrically interconnect the prewired electrical fixture unit with one of the secondary power distribution panel.

17 Claims, 6 Drawing Sheets

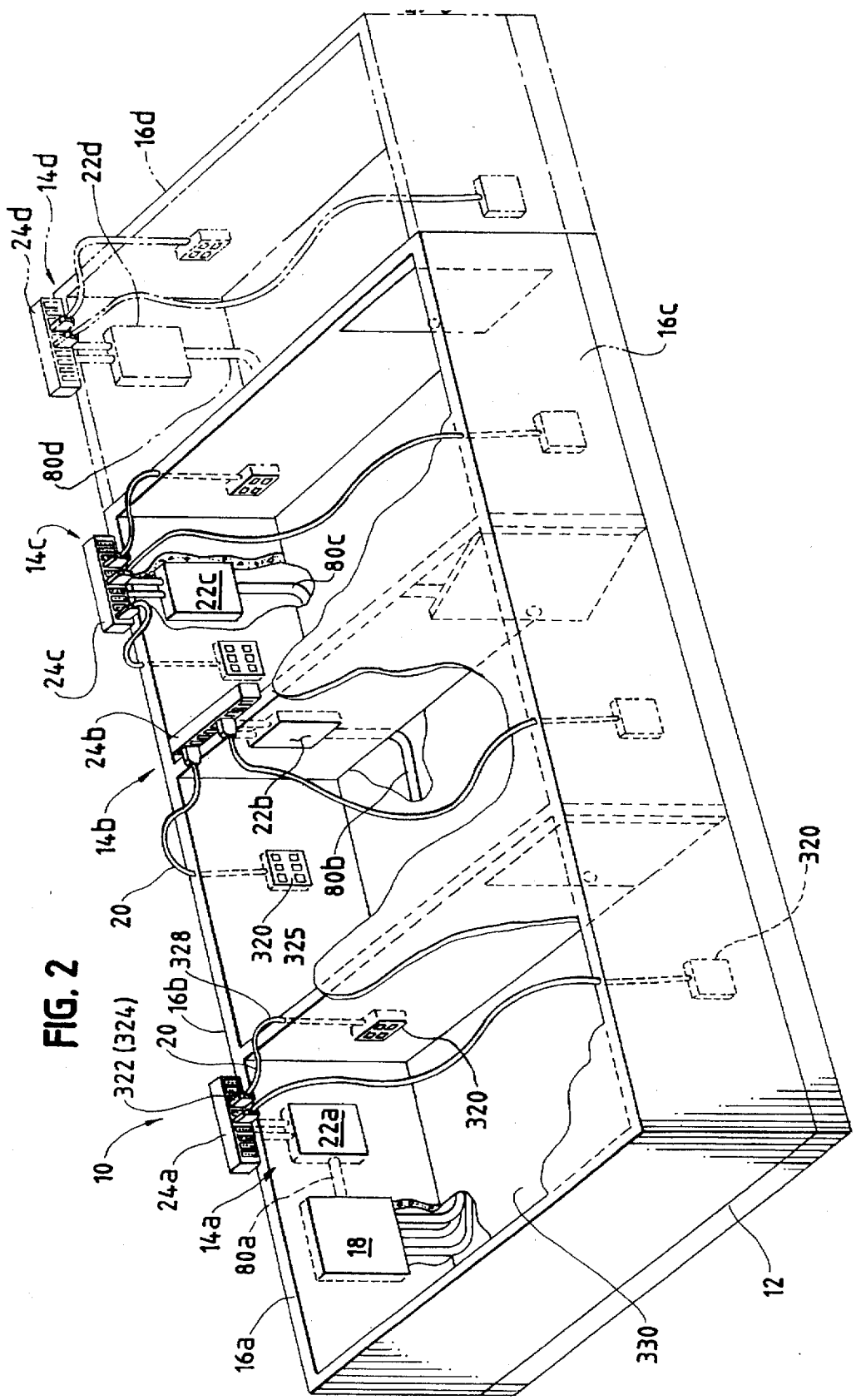

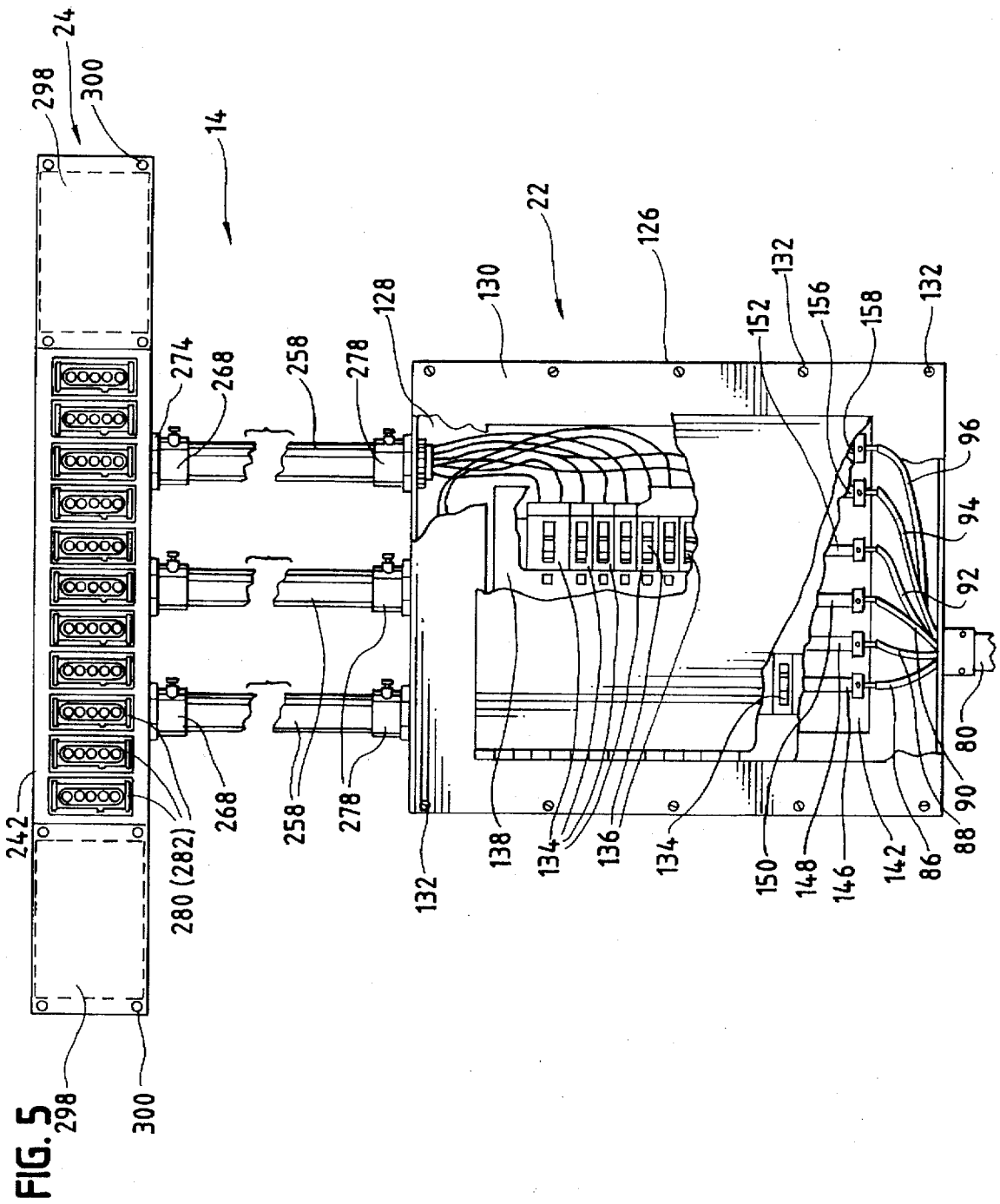

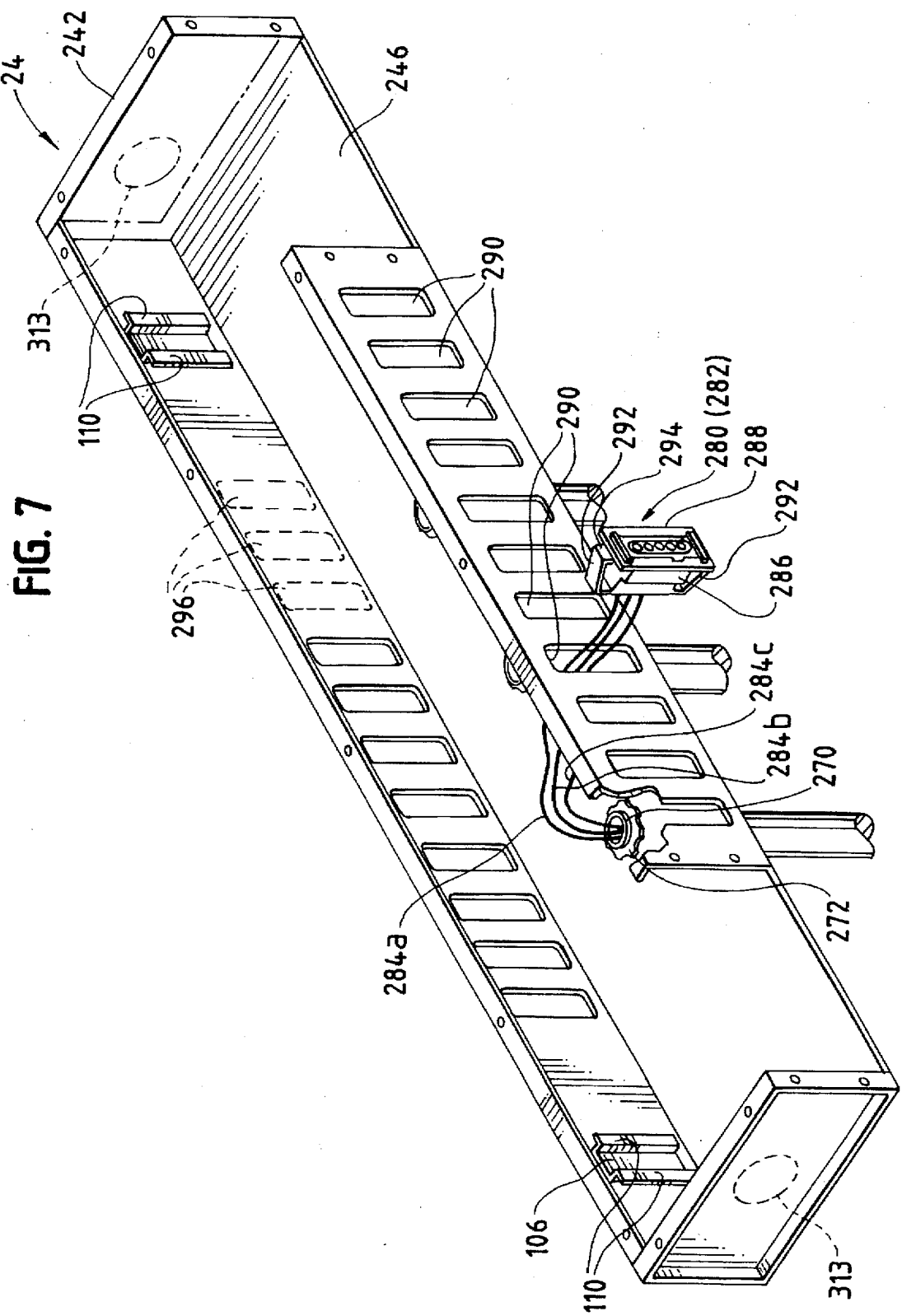

MODULAR POWER DISTRIBUTION SYSTEM

FIELD OF THE INVENTION

This invention relates generally to power distribution systems and, more particularly, to flexible power distribution systems which is well suited for use in modular buildings.

BACKGROUND OF THE INVENTION

Various modular building constructions have been developed wherein prefabricated building modules are constructed at a manufacturing factory and shipped on vehicles to a remote building site where the individual modules are removed from the vehicles, placed onto a foundation at the building site, and interconnected to form the complete structure. The advantages of such construction include a improved quality, reduced total assembly time, and reduced cost which comes through using an assembly line process to prefabricate the various building modules. Conventional wiring systems are not well suited for such buildings because they are time consuming to install and the work must typically be performed by licensed electricians. Specifically, a conventional wiring system typically includes a circuit breaker panel which feeds each circuit in the structure through a separate circuit breaker. These breaker panels are manually wired by electricians at the building site by routing wires from the circuits to a respective circuit breaker. Hence, in order to further reduce the cost of such buildings and to further simplify their final assembly, there is a need for an electrical system which can be assembled at the construction site without the need for skilled personnel and particularly electricians.

SUMMARY OF THE INVENTION

Accordingly, one object of the present invention is to provide hardware for use in wiring residential and commercial buildings.

Another object of the invention is to provide modular hardware for use in wiring residential and commercial buildings.

Yet another object of the present invention is to provide electrical hardware which is well suited for use in modular buildings.

Still another object of the present invention is to provide electrical hardware which substantially reduces the man hours required to electrically wire a building.

Another object of the invention is to provide hardware for use in wiring residential and commercial buildings which is simple to interconnect to such an extent that the building can be electrically wired by unskilled personnel.

The above and other objects and advantages are provided by a modular power distribution system comprising a plurality of modular power distribution units, each of which is adapted to distribute power within a preselected portion of the building. A primary power distribution panel is connected to receive power from the utility service and distribute it to the modular distribution units. The primary power distribution panel includes a plurality of main circuit breakers, each of which is electrically connected between the utility service and one of the modular power distribution units for limiting the maximum current through a respective modular power distribution unit. Each modular power distribution unit comprises a secondary power distribution panel which is physically and electrically interconnected with an associated service distribution unit. The secondary power distribution panel includes a plurality of secondary circuit breakers, and the service distribution unit includes a plurality of modular electrical connector first portions. Each modular connector first portions is connected to receive power through a different one of the secondary circuit breakers. The distribution system also includes a plurality of prewired electrical fixture units, each of which includes an electrical fixture, a modular electrical connector second portion, and a plurality of electrical conductors extending between the electrical fixture and the electrical connector second portion to transmit electrical power therebetween. The modular connector second portions are electrically and physically mateable with the electrical connector first portions to electrically interconnect the prewired electrical fixture units with the secondary power distribution panels.

BRIEF DESCRIPTION OF THE DRAWINGS

For a more complete understanding of this invention reference should now be had to the embodiment illustrated in greater detail in the accompanying drawings and described below by way of example of the invention.

In the drawings:

FIG. 2 is a perspective view of the modular power distribution system of FIG. 1 installed in a modular building.

FIG. 5 is a front fragmentary view of a modular distribution unit utilized the modular power distribution system of FIG. 1.

FIG. 7 is a perspective view of the service distribution unit of FIG. 6, with the top and front covers removed.

DETAILED DESCRIPTION OF THE PREFERRED EMBODIMENTS

Figure 1:
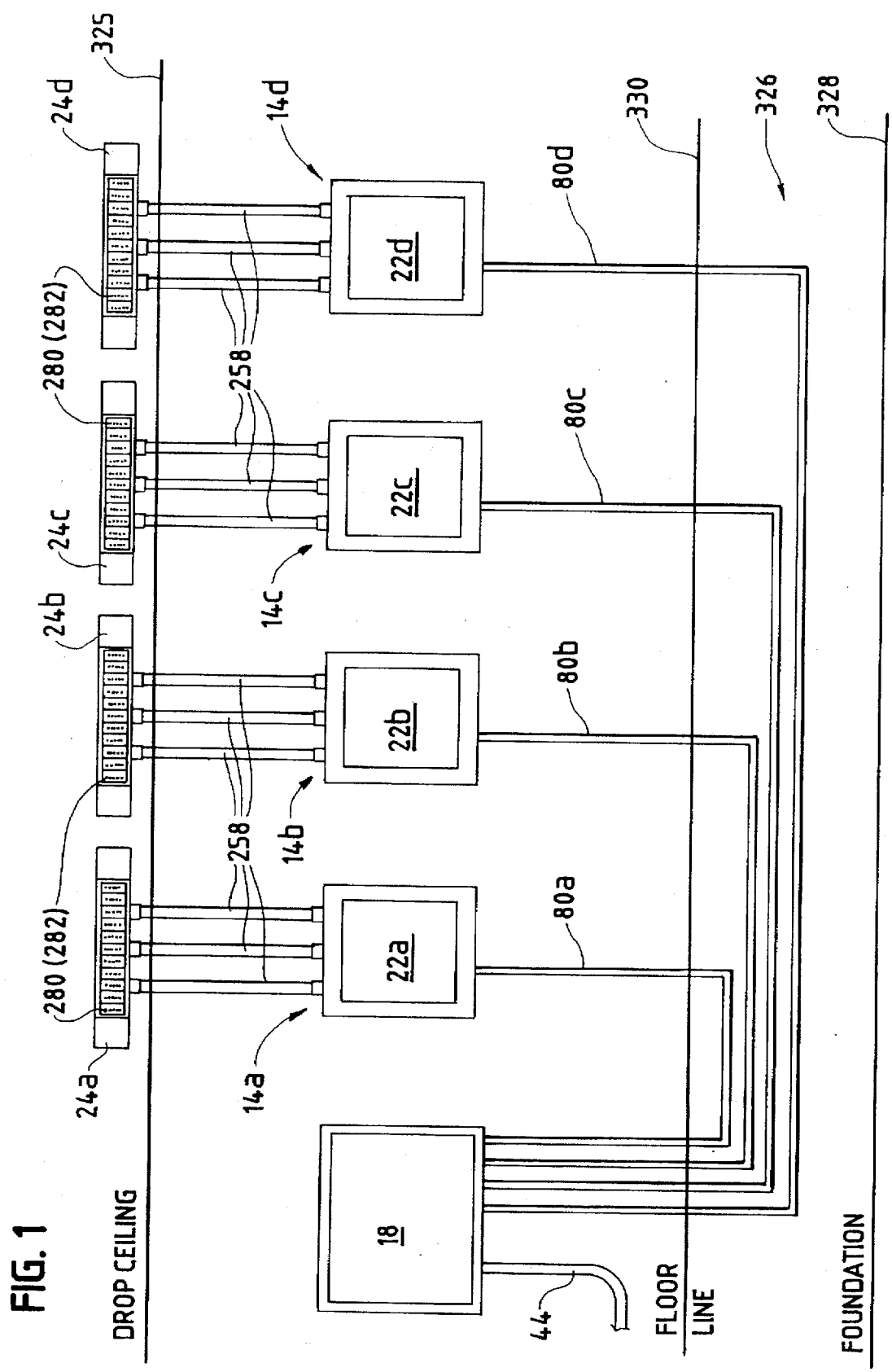
FIG. 1 is a schematic illustration of the modular power distribution system of the present invention.

Referring now to FIGS. 1 and 2, a modular power distribution system 10 for distributing electrical power within a building 12 (or a portion of a building, e.g., on a given floor of the building) includes three main components: (1) a plurality modular power distribution units 14a–14d, each of which is adapted to distribute power within a preselected portion 16a–16d (wiring region) of the building 12; (2) a primary power distribution panel 18 which is connected to receive power from the utility service (not shown) and to distribute it to the modular distribution units 14; and (3) a plurality prewired electrical fixture units 20 (See FIG. 2). Four modular distribution units, 14a–14d, are shown in the illustrated embodiment; however, it should be appreciated that the number of units 14 will depend on the power distribution needs of each specific application.

Figure 3:
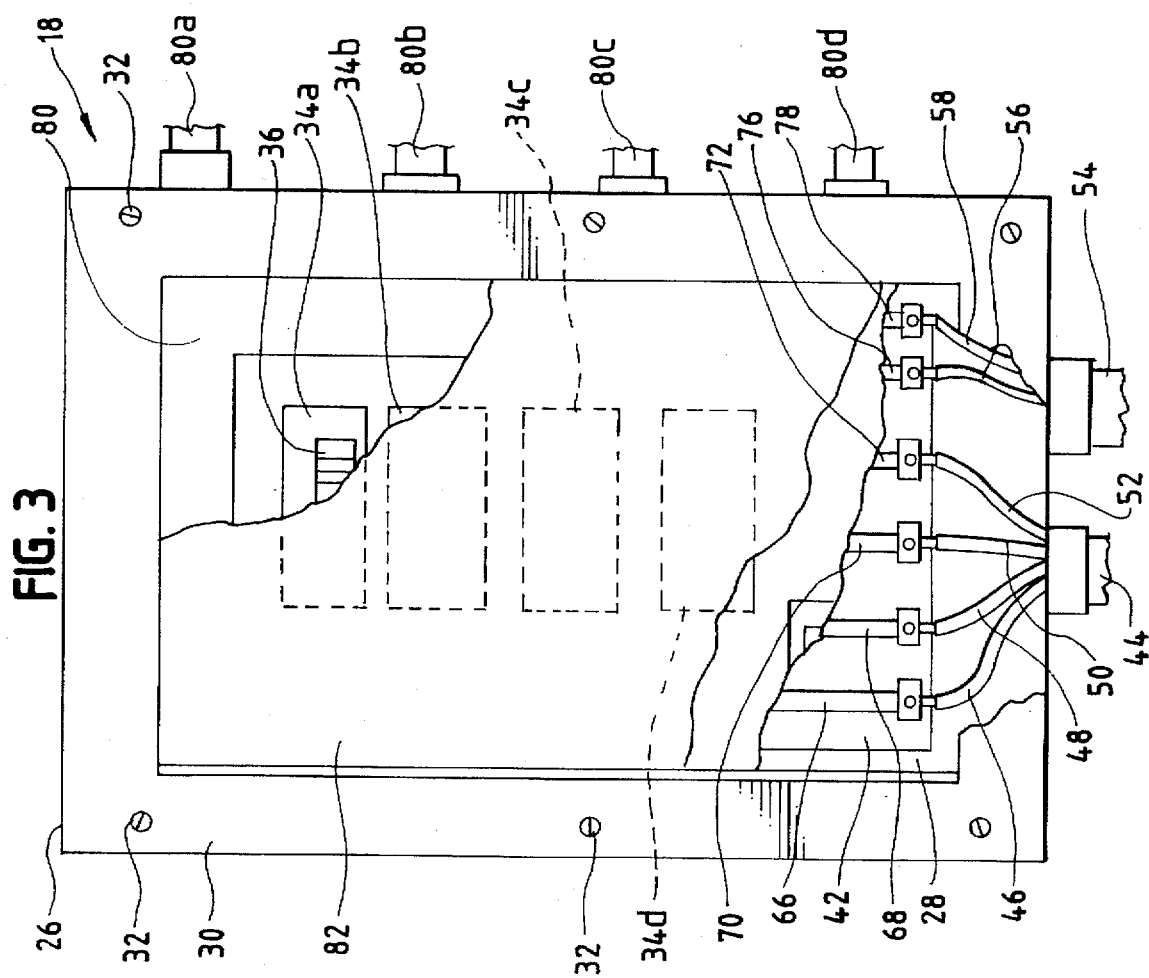
FIG. 3 is a front fragmentary view of a primary power distribution panel which is utilized in the modular power distribution system of FIG. 1.

Referring additionally to FIG. 3, the primary power distribution panel 18 is in the form of a conventional electrical circuit breaker box. A suitable breaker box is an I-line panel box which is available from the Square-D Company. Suitable breaker boxes are also available from Seimens and General Electric. The housing 26 of the breaker box defines an interior compartment 28. The front panel 30 of the housing 26 is removable secured to the rest of the housing by a plurality of threaded fasteners 32 to provide access to the interior compartment 28 during assembly. The interior compartment 28 carries an input buss 42 which is connected via a service conduit 44 to receive 3 phase, 4 wire service from a utility service transformer (not shown). It should be appreciated that in some applications, single phase power will be delivered to the circuit box instead of three phase power. The service conduit 44 carries four service connection wires 46–52 (one power (or hot) wire 46, 48, 50 for each of the three phases and one for neutral wire 52). Another input conduit 54 routes an equipment ground wire 56 and an isolated ground wire 58 into the interior compartment 28. The service connection wires 46–52 each have one end connected to the input buss 42 of the primary power distribution panel 18 and a second end connectable to the to the service transformer for delivering electrical power to the panel 18. For this purpose, the input buss 42 includes three power (hot) buss bars 66–70 (one for each of the three phases) and a neutral buss bar 72. Similarly, the ground wires 56, 58 are connected between the respective buss bars 76, 78 and external ground rods (not shown).

Figure 4:
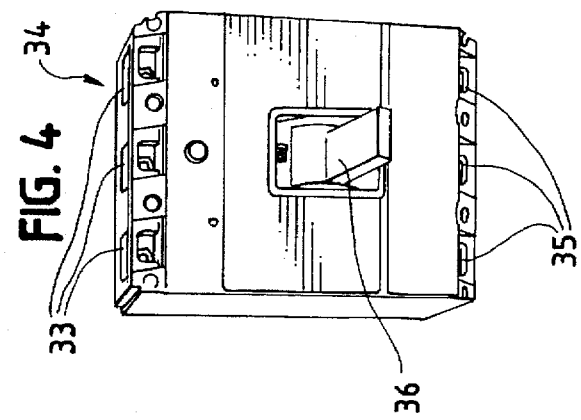
FIG. 4 is a perspective view of a circuit breaker which may be used in the primary power distribution panel utilized of FIG. 3.

The housing interior compartment 28 also supports a plurality (four in the illustrated embodiment) of the main circuit breakers 34a–34d, each of which is electrically connected between the input buss 42 and a different one of the modular power distribution units 14a–14d for limiting the maximum current through a respective modular power distribution unit. The circuit breakers 34 are of a conventional design and are available from the above-identified suppliers of the circuit breaker box. Referring additionally to FIG. 4, each of the main circuit breakers 34 has three input terminals 33 (one per phase) electrically interconnected with different ones of the three power buss bars 66, 68, 70 (e.g., by wires or contacts formed on the circuit breakers). Each main circuit breakers 34 also has three output terminals 35a–35c. The output terminals 35 are electrically to the input buss 142 of an associated modular distribution unit 14 by three power conductors 86, 88, 90 (one per phase) which are carried by a respective service conduit 80. The circuit breakers 34 have internal breaker mechanisms (not shown) for forming an open circuit between the input and output terminals 33, 35 when the current draw therebetween exceeds a preselected value. The breaker mechanism is of a well known, conventional construction and will not be described in detail herein. The circuit breakers 34 may be of the automatic reset type, or they may include respective reset buttons 36 for resetting the circuit breaker when a current overload trips to circuit breaker to its open circuit position. The circuit breaker reset buttons 36 extend through openings in an interior cover 80 which is provided to prevent accidental contact with the electrical wires contained in the panel 22. The front panel 30 of the housing includes a hinged door 82 which may be opened to access the circuit breaker reset buttons 36.

Referring additionally to FIG. 5, each modular power distribution unit 14 comprises a secondary power distribution panel 22 which is physically and electrically interconnected with an associated service distribution unit 24. The secondary power distribution panels 22 are also in the form of convention circuit breaker panels which have a construction similar to that of the breaker box used for the primary power distribution panel 18. Suitable housings are commercially available from the Square-D Company as model NQOD breaker box, Siemens, or from General Electric. Each secondary power distribution panel 22 includes an box shaped exterior housing 126 which defines an interior compartment 128. The front panel 130 of the housing 126 is removable secured to the rest of the housing by a plurality of threaded fasteners 132 to provide access to the interior compartment 128 during assembly.

The interior compartment 128 includes a input buss 142 which is interconnected with the service conductors 86–96 from a respective distribution conduit 80 for receiving three phase power through a respective one of the main circuit breakers 34. For this purpose, the input buss includes three power buss bars 166–170, each of which has a connection terminal connected to the end of one of the power conductors 86, 88, 90. The input buss 142 also includes a neutral buss bar 152, an equipment ground buss bar 156, and an isolated ground buss bar 158. Each ground buss bars 156, 158 is connected to a respective ground buss bar 56, 58 in the primary power distribution panel 18 by a conductor 94, 96 which is routed through the service conduit 80. Similarly, the neutral buss bar 152 is electrically connected to the neutral buss bar 52 in the primary power distribution panel 18 by a conductor which is routed through the service conduit 80.

The interior compartment 128 also carries a predetermined number of secondary circuit breakers 134. The number of secondary circuit breakers 134 is dependent on the number of prewired electrical fixture units to be used in a particular wiring region 16a–16d, as well as the power requirements of the fixture units. In the system which was being developed by the assignee of this application, the secondary circuit breakers are 20 amp, single phase circuit breakers. The secondary circuit breakers 134 are of conventional design, and have a construction which is generally the same as the main circuit breakers 34, except that the secondary circuit breakers only have one input terminal (not shown) and one output terminal (not shown), and the secondary breakers 134 have a lower rated capacity (preferably 20 amps) than the primary circuit breakers 34. Suitable circuit breakers are available from the supplier of the breaker box, i.e. either the Square-D Company or Siemens. Each of the circuit breakers 134 has its input terminal electrically connected to one of the power buss bars 146–150 (e.g., by wires or contacts formed on the circuit breakers) to receive single phase power therefrom.

Figure 6:
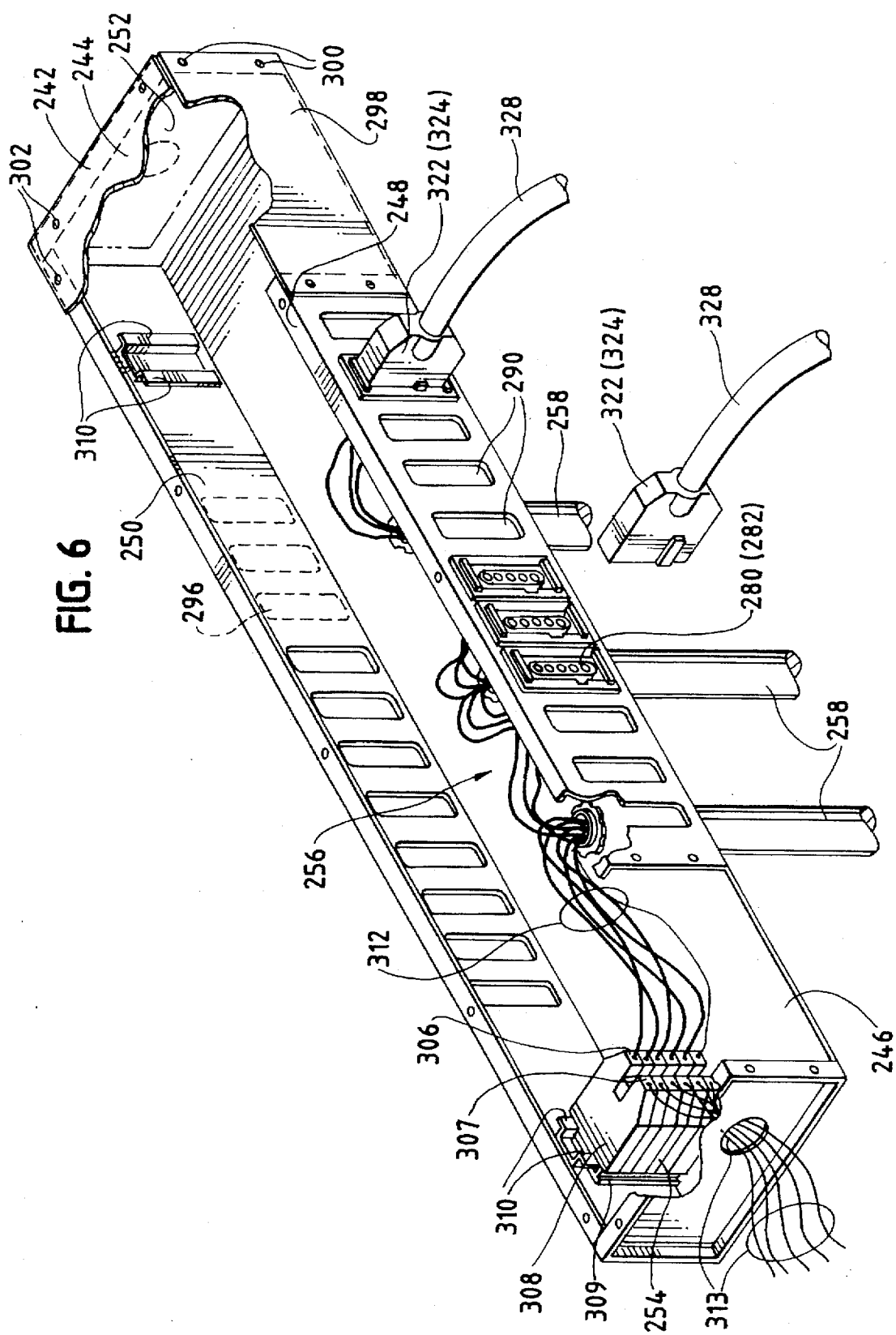
FIG. 6 is a fragmented perspective view of a service distribution unit which is utilized in the modular distribution unit of FIG. 5.

Referring additionally to FIGS. 6 and 7, the service distribution unit 24 includes a box shaped housing 242 having top wall 244, a bottom wall 246, a front wall 248, a back wall 250, and two opposing side walls 252, 254. The housing walls 242–254 define an interior compartment 256. The service distribution unit housing 242 is rigidly secured to the housing 126 of the secondary power distribution panel by three rigid tubular conduits 58. In addition to securing the housings 126, 248 to each other, the conduits 258 provide passages for routing electrical wires between the secondary power distribution panel 22 and the service distribution unit 24.

Conduit connectors 268, 278 are used to physically secure the ends of the conduits 258 to the secondary power distribution panel 22 and the service distribution unit 24. Specifically, a first set of conduit connectors 268 are used to secure the upper ends of the conduits 258 to the bottom wall 246 of the service distribution unit 24. Each conduit conductor 268 has a threaded upper portion 270 (see FIGS. 6 and 7) sized to fit within reciprocal aperture formed in the bottom wall 246 of the housing 242. A lock nut 272 is threaded onto the upper end of the connector 268 to sandwich the bottom wall 246 of the housing 242 between the lock nut 272 and a collar 274 (see FIG. 5) which is integrally formed at the lower end of the connector's threaded portion 270. The conduit 258 is in turn is inserted into the bottom of the connector 268 and is secured in place by a set screw 276 (see FIG. 5). The lower ends of the conduits 258 are similarly secured within openings formed in the upper wall of the secondary power distribution panel 222 by a second set of conduit connectors 278.

The service distribution unit 24 carries a plurality of output terminals 280 in the form of modular electrical connector first portions 282. Each connector first portions 282 is electrically connected by a set of connection wires 284 (see FIG. 7) to receive power from a different one of the secondary circuit breakers 234 in the associated secondary power distribution panel 22. Specifically, the conductors 284 include a power (or hot conductor) 284a, a neutral conductor 284b, and at least one ground conductor 284c. (The equipment ground is generally used in all applications, and the isolated ground is used, in addition to the equipment ground, when power is being delivered to computer equipment, for example. The main conductor 284a is connected between the output terminal of the associated circuit breaker 134 and a respective input terminal (not shown) on the connector first portion 282. The neutral and ground conductors 284b, 284c are connected between input terminals (not shown) on the modular connector first portion 282 and the neutral buss bar 152 and the appropriate ground buss bars 156, 158, respectively, in the secondary distribution panel 22.

The connector first portions 282 are constructed in accordance with the wire connector shown in FIG. 1 of U.S. Pat. No. 4,857,016, the disclosure of which is specifically incorporated by reference herein. These connectors first portions 282 are commercially available from Walker Systems Inc. of Williamstown, W. Va. As can best be seen in FIG. 7, the connector first portion 282 has an outer housing 286 which includes a front flange 288. The periphery of the housing 286 is generally rectangular and is sized to slide into any one of a plurality of reciprocal mounting apertures 290 which are formed in the front and back walls 248, 250 of the housing 242. The mounting apertures 290 are preferably formed by knock outs 296 which are removed during assembly of the service distribution unit 24 so that the service distribution unit 24 may be equipped with varying number of output terminals 280.

During assembly, the connector housing 286 is inserted into the mounting aperture 290 from the outside. A pair of flexible fingers 292 extend from opposite sides of the housing 286 and are stepped or serrated at their top edges 294. As the housing 286 is pushed into the mounting aperture 290, the edges of the aperture 290 compress the fingers 292 inwardly. The housing 286 is pushed into the aperture 290 until the inner face of the front flange 288 abuts the front wall 248 of the service distribution unit 24, at which time the fingers 290 flex outwardly so that the stepped edge 294 engages the underside of the front wall 248 to secure the connector 282 in position.

The top wall 244 and two portions 298 of the front wall 248 are removable secured to the rest of the housing by threaded fasteners 300. These removable portions 244, 298 provide access to the housing interior 256 during assembly and installation. The removable front wall portions 298 can be replaced with apertured panels to accommodate additional output terminals 282.

The back wall 250 of the housing 242 may also include din rails 310 for supporting commercially available terminal blocks 308. Suitable terminal blocks are W-series feedthrough terminal blocks 308 which are available from Weidmuller, Inc. of Detmold Germany. The terminal blocks have mounting flanges 309 which slide onto the din rails 310 during assembly. Preferably, there are at least six of the terminal blocks 308 mounted in the housing 242 (one for each of the three power phases, two for ground, and one for neutral). Each terminal block 308 has an input terminal 306 and an output terminal 307. Three of the terminal blocks 308 have their input terminals 306 connected to different ones of the power buss bars 146-150 through circuit breakers (not shown) which are positioned in the secondary distribution panel 22. These circuit breakers are of the same general construction as those described above. The other three terminal blocks have their input terminals 306 wired directly different ones of the to the ground buss bars 156, 158 and the neutral buss bar 152 respectively. Output wires 313 may be preconnected to the output terminals 307 at the factory. The wires 313 extend form the housing 242 through knock outs 315 in the housing side walls 252, 254. Alternatively, the wires 313 may be connected to the output terminals 307 in the field by removing the housing top cover 244 to access the terminal blocks. The wires 313 are then routed through the knock outs 315 to the appropriate location in the building.

As can best be seen in FIGS. 2 and 6, each of the prewired electrical fixture units 20 includes an electrical fixture 320, a connection jack 322 in the form of a modular electrical connector second portion 324, and an electrical conduit 328. The conduit 328 carries a plurality of electrical conductors (not shown) which extends between the electrical fixture 320 and the electrical connector second portion 324 to transmit electrical power therebetween. Preferably each conduit carries a power conductor, a neutral conductor, and at least one ground conductor. The connector second portions 324 are electrically and physically mateable with the electrical connector first portions 282 to electrically interconnect the prewired electrical fixture unit 20 with the secondary power distribution panels 22. The modular connector second portions 324 are preferably constructed in accordance with the wire connector shown in FIGS. 12-15 of the above-referenced U.S. Pat. No. 4,857,016. These connectors are commercially available for Walker Systems Inc. of Williamstown, W. Va. The electrical fixture 320 may be any of a number of conventional electrical fixtures such as electrical outlets and/or lighting circuits (i.e. control switch and lighting fixture).

As can be seen in FIG. 2, the modular power distribution system 10 is ideally suited for use in modular buildings. In such an environment, each building module 16a-16c is preferably treated as a separate wiring zone. The primary power distribution panel 18 is suitably mounted in one of the building modules 16a at the building factory. Modular power distribution units 14a-14d are also suitably mounted in each of the building modules 16a-16d at the building factory. The power distribution units 14 are positioned so that the service distribution units 24 are located above the building's finished ceiling 325 (which is typically a removable panel drop ceiling) This placement allows easy and convenient interconnection of the prewired electrical fixture units 20 with the service distribution units 24.

The primary power distribution panel 18 is used to distribute power from the utility service to the modular power distribution units 14a-14d, and each of the modular power distribution units 14a-14d in turn distributes power within a respective building module 16a-16d. As will be appreciated, such an arrangement may also be used in traditional (i.e. nonmodular) buildings by dividing the building, or part of the building, into wiring zones which receive power from individual modular power distribution units 14. Each building module 16a-16d is also provided with a plurality of prewired electrical fixture units 20, the type and number of which are predetermined in accordance with the specific needs of the particular building module 16. The fixtures 320 of the prewired fixture units 20 are appropriately mounted in the building walls at the factory. During this step, the service conduits 320 are routed up through the top of the building walls and above the building's ceiling 325 where they may be interconnected with the appropriate output terminals 280. The prewired electrical fixture units 20 are preferably interconnected with the service distribution units 24 at the building factory; however, they may also be interconnected at the construction site. To insure the prewired electrical fixture units 20 are connected to the proper output terminal 280, the connector first and second portions 282, 324 are marked with visual indicia (such as numerals, letters or a combination thereof) for indicating the specific terminal 280 to which a prewired electrical fixture unit 20 is to be connected. It is foreseeable that in some applications it might also be desirable to construct the modular connector first portions 282 to be physically mateable with only a specific one of the connector second portions 324 in order to prevent the prewired electrical fixture unit 20 from being connected to the wrong output terminal 280. Similarly, the output wires 313 and the terminal blocks 308 may be marked with visual indicia for indicating the specific terminal block 308 to which a wire is to be connected.

The completed building modules 16a–16d are then shipped to the building site where they are placed on the building foundation and interconnected to form the completed structure. As the building modules 16 are placed on the foundation, the flexible distribution conduits 80a–80d from the modular power distribution units 20 are unrolled and routed through the crawl space 326 between the building foundation 328 and the building floor 330. The free ends of the distribution conduits 80 (and the conductors contained therein) are then appropriately interconnected to the input buss 42 of the primary power distribution panel 18. The service conduit 44 from the primary power distribution panel 18 is then appropriately connected to the utility service transformer. As is shown in FIG. 1, the modular power distribution unit 14a which is in the same building module as the primary distribution panel 18 may be interconnected with the panel 18 by rigid conduit instead of flexible conduit. Preferably this step is performed at the factory before the building modules 14a, 18 are shipped to the construction site.

The modular power distribution units 14 and prewired electrical fixture units 20 are also suitable for smaller applications, such as residential construction, where only one modular power distribution unit 14 is required. (It will be appreciated that in such applications the modular power distribution unit 14 may also include a master circuit breaker for controlling the maximum current draw through the modular power distribution unit 14). In such applications, the modular power distribution unit 14 is preassembled at a manufacturing facility and shipped to a building site for installation. Specifically, the modular distribution unit 20 has all of the internal wiring completed at the factory (including interconnecting the circuit breakers 134 between the input buss 142 and the modular connectors 280). As such, installation at the building site is limited to physically securing the modular power distribution unit 14 and prewired electrical fixture units 20 within the building subframe, connecting the distribution unit 20 to the remote source of electrical power (i.e. the utility transformer), and interconnecting the service distribution unit 24 with the prewired electrical fixture units 20.

The power distribution system described herein also gives great flexibility in both the assembly and installation process. For example, in the context of modular buildings, it is foreseeable that various that the electrical components could be preassembled at one facility and shipped to another facility for installation into the building modules.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A modular power distribution system comprising:
  A. a plurality of secondary power distribution panels, each of which includes an input buss and a plurality of secondary circuit breakers which are connected to the input buss and are adapted to limit the power through an associated electrical circuit;
  B. a primary power distribution panel having an input buss connectable to receive electrical power from a utility service and a plurality of main circuit breakers connected receive power from the input buss, each of the main circuit breakers being associated with a different one of the secondary power distribution panels and is adapted to limit the maximum current through the associated secondary power distribution panel;
  C. a plurality of electrical distribution conduits, each distribution conduit extending between the primary power distribution panel and a different one of the secondary power distribution panels, each distribution conduit carrying a plurality of electrical conductors, each conductor having a first end connected to an associated one of the main circuit breakers and a second end connected to the input buss of an associated secondary power distribution panel for delivering electrical power from the primary power distribution panel to the associated secondary power distribution panel;
  D. a plurality of service distribution units, each service distribution unit being associated with a different one of the secondary power distribution panels and including a housing which supports a plurality of modular electrical connector first portions, each modular connector first portion being electrically connected to receive power from a different one of the secondary circuit breakers in the associated secondary power distribution panel; and
  E. a plurality of prewired electrical fixture units, each prewired electrical fixture unit including an electrical fixture, a modular electrical connector second portion, and a plurality of electrical conductors extending between the electrical fixture and the electrical connector to transmit electrical power therebetween, the modular electrical second portions being electrically and physically mateable electrical connector first portions to interconnect the prewired electrical fixture unit with one of the service distribution units.

2. A modular power distribution system as set forth in claim 1, wherein the modular connectors are marked with visual indicia for indicating the appropriate interconnection between the modular connector first portions and the modular connector second portions.

3. A modular power distribution system as set forth in claim 1, further comprising means for physically connecting each service distribution unit to an associated secondary power distribution panel.

4. A modular power distribution system as set forth in claim 3, wherein the means comprises at least one rigid conduit having a first end physically secured to the service distribution unit, a second end physically secured to the secondary power distribution panel, and a passage extending between the first and second ends for routing electrical conductors between the service distribution unit and the secondary power distribution panel.

5. A modular power distribution system as set forth in claim 1, wherein the distribution conduits have their first ends connected to the secondary power distribution panels prior to delivery to a building site, and wherein the second ends of the conduits are adapted to be connected to the primary power distribution panel at the building site.

6. A modular power distribution system as set forth in claim 5, wherein at least some of the distribution conduits are flexible conduits.

7. A modular power distribution unit adapted for interconnecting a plurality of electrical fixtures with a source of electrical power, comprising:
   A. an electrical circuit breaker panel comprising:
      1. a housing defining an interior compartment;
      2. an input buss mounted in the housing interior compartment; and
      3. a plurality of circuit breakers mounted in the housing interior compartment, each circuit breaker having an input terminal, an output terminal, and means for forming an open circuit the between the input and output terminals when the current draw therebetween exceeds a preset value;
   B. an electrical conduit extending from the circuit breaker panel and carrying a plurality of electrical conductors, each of the conductors having a first end connected to the input buss of the circuit breaker panel and a second end connectable to the source of electrical power for delivering electrical power to the circuit breaker panel;
   C. a service distribution unit physically and electrically interconnected with the circuit breaker panel, the service distribution unit comprising:
      1. a housing; and
      2. a plurality of modular electrical connector first portions carried by the service distribution unit housing, each of the connector first portions being electrically connected to receive-power from a different one of the circuit breakers and being mateable with a reciprocal modular wiring connector second portion for delivering electrical power to a different one of the electrical fixtures.

8. A modular power distribution unit as set forth in claim 7, wherein the electrical conduit which connects the circuit breaker panel to the source of electrical power is flexible.

9. A modular power distribution unit as set forth in claim 7, further comprising a rigid conduit having a first end physically secured to the service distribution unit, a second end physically secured to the circuit breaker panel, and a passage extending between the first and second ends for routing electrical conductors between the service distribution unit and the circuit breaker panel.

10. A modular power distribution trait as set forth in claim 7, wherein the modular power distribution unit is preassembled at a manufacturing facility and shipped to a building site for installation, the installation at the building site being limited to physically securing the modular power distribution unit within the building subframe and connecting the second end of the conductors to the remote source of electrical power.

11. A modular power distribution system comprising:
   A. a primary power distribution panel having an input buss connectable to receive electrical power from a utility service and a plurality of main circuit breakers, each of the main circuit breakers having an input terminal connected to receive power from the input buss, an output terminal, and means for forming an open circuit the between the input and output terminals when the current draw therebetween exceeds a preset value;
   B. a plurality of modular power distribution unit, each modular power distribution unit being associated with a different one of the main circuit breakers and each modular power distribution unit comprising:
      1. an secondary power distribution panel comprising:
         a. a housing defining an interior compartment;
         b. an input buss mounted in the housing interior compartment; and
         c. a plurality of secondary circuit breakers mounted in the housing interior compartment, each of the secondary circuit breakers having an input terminal and an output terminal and a means for forming an open circuit between the input and output terminals when the current draw therebetween exceeds a preset value;
      2. an electrical distribution conduit extending from the secondary power distribution panel and carrying a plurality of electrical conductors, each conductor having a first end connected to the input buss of the secondary power distribution panel and a second end connected to the associated main circuit breaker for delivering power from the primary power distribution panel the secondary power distribution panel;
      3. a service distribution unit physically and electrically interconnected with the secondary power distribution panel, the service distribution unit comprising:
         a. a housing; and
         b. a plurality of modular electrical connector first portions carried by the service distribution unit housing, each connector first portion being electrically connected to receive power from a different one of the secondary circuit breakers; and
   C. a plurality of prewired electrical fixture units, each prewired electrical fixture unit including an electrical fixture, a modular electrical connector second portion, and a plurality of electrical conductors extending between the electrical fixture and the connector second portion to transmit electrical power therebetween, the connector second portions being electrically and physically mateable connector first portions to electrically interconnect the prewired electrical fixture unit with one of the secondary power distribution panels.

12. A modular power distribution system as set forth in claim 11, wherein each modular power distribution unit further comprising at least one rigid conduit having a first end physically secured to a respective service distribution unit, a second end physically secured to a respective secondary power distribution panel, and a passage extending between the first and second ends for routing electrical conductors between the service distribution unit and the secondary power distribution panel.

13. A modular power distribution system as set forth in claim 11, wherein the distribution conduits panels have their first ends connected to the secondary power distribution panels prior to delivery to a building site and wherein the second ends of the conduits are adapted to be connected to the primary power distribution panel at the building site.

14. A modular power distribution system as set forth in claim 13, wherein at least some of the distribution conduits flexible conduits.

15. A modular power distribution system comprising for use in a modular building of the type having a plurality of preconstructed building modules which are interconnected to form a building, comprising:

- a primary power distribution panel positioned in one of the building modules and being adapted to distribute power from the utility service to the building modules;
- a plurality of modular power distribution unit, each of the modular power distribution units being positioned in a different one of the building modules and being adapted to distribute power within a respective building module;
- means for electrically connecting the modular power distribution units to receive electrical power from the primary power distribution panel;
- a plurality of prewired electrical fixture units positioned in each building module;
- the primary power distribution panel having an plurality of main circuit breakers, each of which is electrically connected between the utility service and a different one of the modular power distribution units for limiting the maximum current through a different one of modular power distribution unit;
- each modular power distribution unit comprising a secondary power distribution panel which is physically and electrically interconnected with an associated service distribution unit, the secondary power distribution panel including a plurality of secondary circuit breakers connected to receive power from respective main circuit breaker, and the service distribution unit including a plurality of modular electrical connector first portions which are connected to receive power through a different ones of the secondary circuit breakers;
- each of the prewired electrical fixture units including an electrical fixture, a modular electrical connector second portion, and a plurality of electrical conductors extending between the electrical fixture and the connector second portion to transmit electrical power therebetween, the connector second portions being electrically and physically mateable connector first portions to electrically interconnect the prewired electrical fixture unit with the secondary power distribution panel from a respective building module.

16. A method for distributing electrical power within a building comprising the steps of:

A. dividing the building into a number of wiring regions;

B. providing a primary power distribution panel for the building, the primary power distribution panel having an input buss connectable to receive electrical power from a utility service and a plurality of main circuit breakers, connected to receive power from the input buss, the circuit breakers being adapted to form an open circuit when the current draw through the circuit breaker exceeds a preset value;

C. providing a modular power distribution unit for each wiring region, each modular power distribution unit being connected to receive power from a different one of the main circuit breakers and each modular power distribution unit comprising:

1. an secondary power distribution panel comprising:
   a. a housing defining an interior compartment;
   b. an input buss mounted in the housing interior compartment; and
   c. a plurality of secondary circuit breakers mounted in the housing interior compartment, and being connected to receive power through the input buss and to form an open circuit when the current draw through the circuit breaker exceeds a preset value;
2. an electrical conduit extending from the secondary power distribution panel and carrying a plurality of electrical conductors, each conductor having a first end connected to the input buss of the circuit secondary power distribution panel and a second end connected to the associated main circuit breaker for delivering power from the primary power distribution panel to the secondary power distribution panel;
3. a service distribution unit physically and electrically interconnected with the secondary power distribution panel, the service distribution unit comprising:
   a. a housing; and
   b. a plurality of modular electrical connector first portions carried by the service distribution unit housing, each of the connector first portions being electrically connected to receive power through a different one of the secondary circuit breakers; and C. providing a plurality of prewired electrical fixture units for each wiring region, each prewired electrical fixture unit including an electrical fixture, a modular electrical connector second portion, and a plurality of electrical conductors extending between the electrical fixture and the electrical connector to transmit electrical power therebetween, the modular electrical second portions being electrically and physically mateable electrical connector first portions to electrically interconnect the prewired electrical fixture unit with one the secondary power distribution panel for a respective wiring zone.

17. A method for distributing electrical power within a building as set forth in claim 16, further comprising the steps preassembling the modular power distribution units prior to delivery to the building site.

* * * * *